Patented Nov. 21, 1939

2,180,953

UNITED STATES PATENT OFFICE 2,180,953

PREPARATION OF AROMATIC ESTERS

Anthony H. Gleason, Elizabeth, N. J., assignor to Standard Oil Development Company, a corporation of Delaware No Drawing. Application April 1, 1937, Serial No. 134,303

8 Claims. (Cl. 260—483)

This invention relates to the preparation of aromatic esters and it relates more particularly to the preparation of products of the type of aceto-acetic esters by reaction of polymers of ketenes, especially cyclobutane 1,3 dione which is the dimer of ordinary ketene, with aromatic hydroxy compounds.

This application is a continuation-in-part of copending application of Peter J. Wiezevich and Anthony H. Gleason, Serial No. 720,946, filed April 17, 1934, now Patent 2,103,505, which in turn is a continuation-in-part of the Wiezevich and Gleason application Serial No. 559,936, filed August 28, 1931, now Patent 1,998,404.

In Patent 1,998,404, a method was described for the preparation in high yields of cyclobutane 1,3 dione presumably having the formula

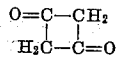

by the polymerization of ketene ($CH_2:CO$) by contacting it with a metallic surface promoting the polymerization of the ketene.

The cyclobutane 1,3 dione (B. Pt. about 127° C.) so prepared may be considered as the anhydride of aceto-acetic acid, since it reacts with water to give aceto-acetic acid and under suitable conditions may be made to react with various other compounds. Thus, although the diketene is believed to have the cyclic structure illustrated above, yet in certain respects it acts as if it had the formula $CH_3.CO.CH:CO$. The exact mechanism of the reaction or reactions involved in the conversion of the diketene (cyclobutane 1,3 dione), which has a cyclic structure, into linear type compounds, such as aceto-acetic acid or esters thereof, is not well understood, although it is believed that the cyclic compound is unstable and that in some manner the ring structure breaks and opens up into a linear type compound. It is also unstable in that frequently simple acetates are formed (from the group $CH_3.CO$) instead of aceto-acetates.

According to the present invention, ketene polymers are reacted with aromatic hydroxy compounds in the presence of a suitable diluent or solvent to produce esters thereof. The preferred ketene polymer is diketene, otherwise known as cyclobutane 1,3 dione, which is the dimer of the simplest member of the ketene family, i. e. acetic ketene, although dehydracetic acid or other higher polymers of ketene may be used and also polymers of other ketenes, such as methyl ketene, etc.

The aromatic hydroxy compounds which may be used are represented by the following list of some of the better known members of this class of compounds, although it is apparent to those skilled in the art that a large number of other aromatic hydroxy compounds exist which could also be used.

| Type | Name | Formula |
|---|---|---|
| Monohydric phenols. | Phenol | $C_6H_5.OH$ |
| | Cresols (o-, m-, p-) | $CH_3.C_6H_4.OH$ |
| | Xylenols | $(CH_3)_2.C_6H_3.OH$ |
| | Carvacrol | $(CH_3)_2CH.C_6H_3(CH_3).OH$ |
| Dihydric phenols | Catechol | $C_6H_4(OH)_2$ (o-) |
| | Resorcinol | $C_6H_4(OH)_2$ (m-) |
| | Orcinol | $CH_3.C_6H_3(OH)_2$ |
| Trihydric phenols | Pyrogallol | $C_6H_3(OH)_3$ (1:2:2) |
| | Phloroglucinol | $C_6H_3(OH)_3$ (1:3:5) |
| Polynuclear compounds. | Naphthols (α and β) | $C_{10}H_7.OH$ |
| | Dihydroxy naphthalenes | $C_{10}H_6(OH)_2$ |
| | Di-naphthols | $C_{20}H_{10}(OH)_2$ |
| | Ar-tetra-hydro-alpha-naphthol | $C_{10}H_7.H_4.OH$ |
| | Hydroxy anthracenes | $C_{14}H_9.OH$ |
| | Hydroxy anthraquinones | $C_{14}H_6O_2(OH)_2$ |

Instead of using single pure compounds, mixtures of two or more compounds may be used, or crude materials containing substantial amounts of aromatic hydroxy compounds, along with other substances not interfering with the desired esterification. For instance, the product sold commercially as "tricresol," which is a mixture of ortho, meta and para cresols, may be used and, if desired, a crude distillate obtained during the destructive distillation of coal and containing a mixture of so-called "tar acids" may be used. Also, one may use the mixed phenolic product which is obtained by washing petroleum fractions, particularly cracked distillates, with caustic soda and subsequently acidifying as with sulfuric acid.

According to the present invention, the reaction is carried out in the presence of an inert diluent, such as ether, acetone, benzene, toluene, ethylene dichloride, tri- or tetrachlorethane, etc. The reaction is also carried out in the presence of a small amount of an esterification catalyst; for this purpose acids may be used such as hydrochloric, sulfuric, phosphoric, di- or trichloracetic acid, etc., the amount used generally being between the approximate limits of 0.1 to 3% and preferably about ½ or 1% based on the weight of the total reactants. The reaction is also preferably carried out at a temperature between the approximate limits of 0° C. and the boiling point of the ketene polymer used, preferably at or slightly above room temperature but generally below 100° C.

It was surprising to find that the solvent gives proper control and prevents undesirable decomposition and side reactions of these unstable ketene polymers without preventing the desired esterification. In carrying out the invention, the aromatic hydroxy compound is preferably first dissolved in the inert diluent or solvent, then the ketene polymer is added, and finally the catalyst, although this procedure may be varied to some extent as will be understood by those skilled in the art. Means may be provided for heating the reaction chamber to initiate the reaction and also for cooling the reaction mass to prevent overheating due to liberation of heat of esterification.

One desirable method of preparing aromatic esters according to the present invention is first to polymerize ketene in the presence of acetone as a solvent and then, without removing the solvent, add the desired aromatic hydroxy compound to be esterified and a small amount of acid serving as esterification catalyst.

The proportions of materials to be used may vary within fairly broad range, although it is preferable to keep the reactants themselves in approximately equal molar proportions or within the approximate limits of 0.5 to 2 mols of the aromatic hydroxy compound to 1 mol of the ketene polymer. The amount of solvent to be used depends to a certain extent on the temperature at which it is desired to carry out the reaction and also on the melting point, viscosity, and solubility of the aromatic hydroxy compound being used. The solvent may be removed from the ester after completion of the reaction.

The following specific example is given for the sake of illustration, but without intending to limit the invention thereto:

*Example*

About 15 cc. of phenol in ether solution was treated with 15 cc. of the products (obtained by polymerization of ketene under pressure in a steel container), and a trace of sulfuric acid was added. The reaction was so violent as to cause the mixture to boil over. Distillation of the red liquid gave 15 to 20 cc. of the product boiling at 139° C. at 7 mm. The phenyl aceto-acetate so obtained could be employed as a plasticizer.

The foregoing description is merely illustrative and it is not intended that the invention be limited by any of the theories suggested as to the operation of the invention; various changes may be made within the scope of the appended claims in which it is my intention to claim all novelty inherent in the invention as broadly as the prior art permits.

I claim:

1. The method of preparing aromatic esters which comprises reacting aromatic hydroxy compounds with a ketene polymer in the presence of an inert diluent and a small amount of an esterification catalyst.

2. Method according to claim 1 carried out at a temperature between the approximate limits of 0° C. and the boiling point of the ketene polymer used.

3. Method according to claim 1 carried out in the presence of a small amount of an acid serving as an esterification catalyst.

4. The method of preparing aromatic esters which comprises reacting diketene with an aromatic hydroxy compound in the presence of an inert diluent and a small amount of an acid serving as esterification catalyst.

5. Method according to claim 4 in which the aromatic hydroxy compound used is a monohydric phenol.

6. The method of preparing phenyl aceto-acetate which comprises treating a solution of phenol in ether with diketene in the presence of a small amount of sulfuric acid at about room temperature.

7. Process for making an acetoacetate of a phenol which comprises introducing diketene into a solution of a phenol in a solvent therefor which is inert to the reactants.

8. The method of preparing phenol acetoacetate which comprises treating a solution of phenol in a solvent inert to the reactants, with diketene in the presence of an esterification catalyst.

ANTHONY H. GLEASON.